United States Patent [19]
Kanengieter et al.

[11] 3,920,190
[45] Nov. 18, 1975

[54] STACK PROCESSOR
[75] Inventors: Glenn G. Kanengieter, Blooming Prairie; Gerald E. Barry, Owatonna, both of Minn.
[73] Assignee: Owatonna Manufacturing Co., Owatonna, Minn.
[22] Filed: Oct. 21, 1974
[21] Appl. No.: 516,748

[52] U.S. Cl.............................. 241/30; 241/101.7
[51] Int. Cl.² ........................................ A01F 29/00
[58] Field of Search ........ 241/30, 101.7, 247, 260.1

[56] References Cited
UNITED STATES PATENTS
2,084,447   6/1937   Matejcik.......................... 241/101.7
3,779,408   12/1973  Ivie ................................ 241/101.7

*Primary Examiner*—Granville Y. Custer, Jr.
*Attorney, Agent, or Firm*—Schroeder Siegfried Ryan & Vidas

[57] ABSTRACT

A stack processor and method of using the same in which a stack is moved onto a transporting bed through chain flights and advanced thereon during the processing operation by energization and operation of the chain flights to move the stack relative to a pivoted shredding head, the head having a pair of oppositely pitched augers mounted on a shaft with shredding knives positioned on the flights of the augers to loosen and shred compacted material in the stack and advance the same toward a discharge opening in the head wherein it is deposited by gravity onto a conveyor positioned transverse to the extent of the bed for discharge of the shredded crop material therefrom.

10 Claims, 4 Drawing Figures

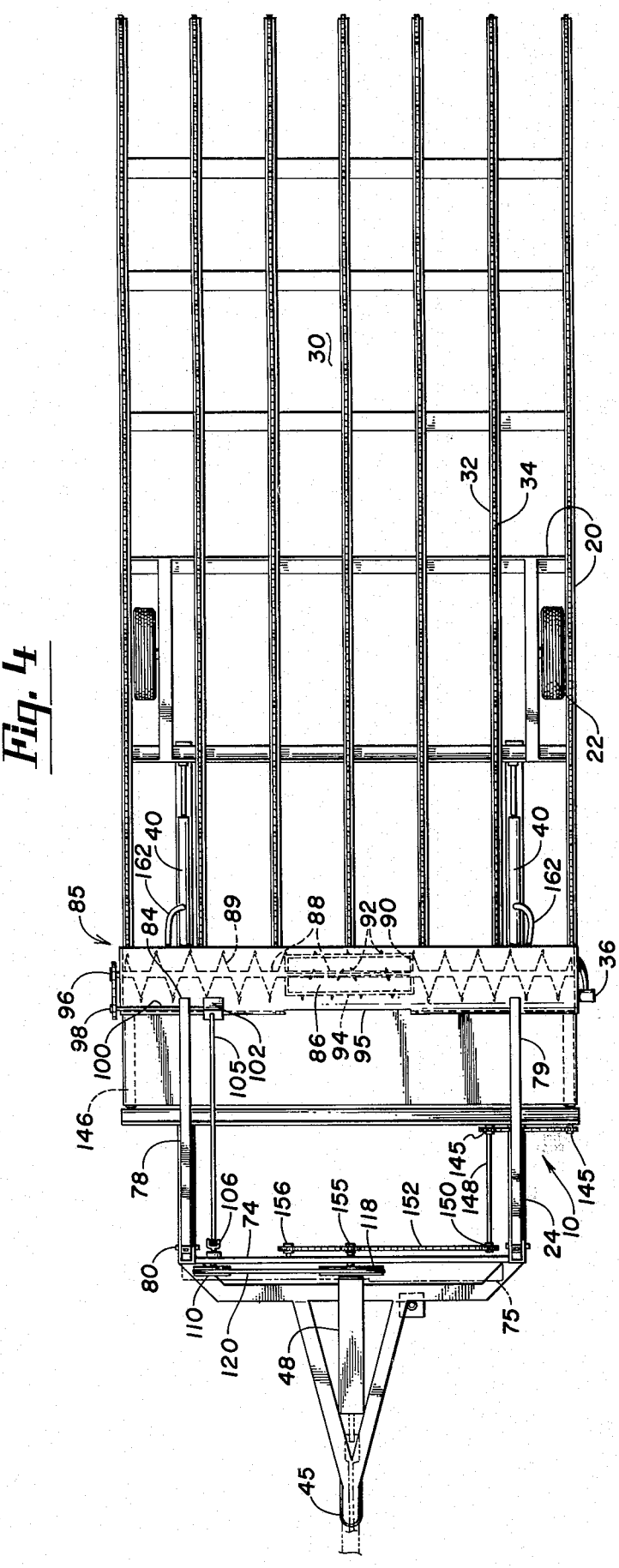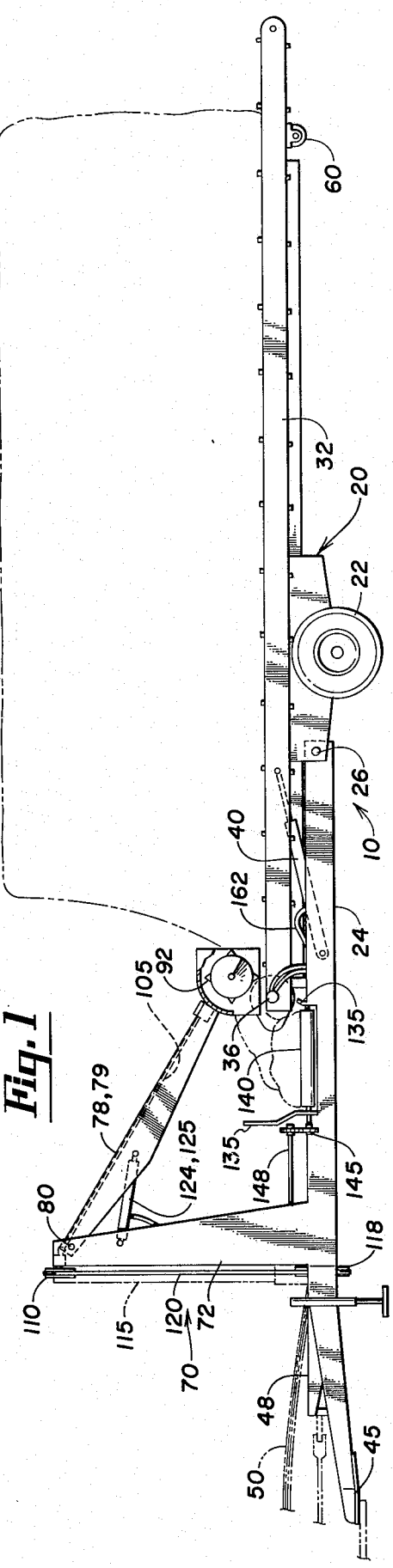

STACK PROCESSOR

My invention relates to a stack processor and more particularly to an improved method and apparatus for shredding a stack of harvested crop and conveying the shredded material away from the stack for feeding purposes.

Stack feeding apparatus for the handling of stacks of harvested crops are known and in use. The present day structures handle the compacted or stacked material in such a manner that the same is not loosened from the stack or compressed relationship making the same difficult to uniformly control the flow of material from the stack for accuracy in feeding. In the present invention an improved stack processor and method is provided in which the stack of harvested crop is processed by a pivoted shredding tool which moves vertically across a stack in an arcuate manner shredding the material in the stack, loosening the same and directing it into a position where it may be conveyed by a transversely extending conveyor to provide for uniform flow of shredded material from the stack. The stack is movable relative to the pivoted boom carrying the shredder and oppositely pitched augers with knife blades thereon which not only shred the stack but direct the shredded material in a direction to eliminate spillage and insure that the same will be deposited on a conveyor to be moved away from the stack.

Therefore, it is the object of this invention to provide an improved stack processor for shredding and distributing material from a stack of harvested crop.

Another object of this invention is to provide an improved method and apparatus for the handling of stacks of harvested crop for feed purposes and to remove portion of the material through a shredding operation to improve feeding therefrom.

A still further object of this invention is to provide an improved stack processor adapted to continuous processing operation.

These and other objects of the invention will become apparent from the reading of the attached description together with the drawings wherein:

FIG. 1 is a side elevation view of the improved stack processor;

FIG. 4 is a top view of the improved stack processor.

Figure 2:
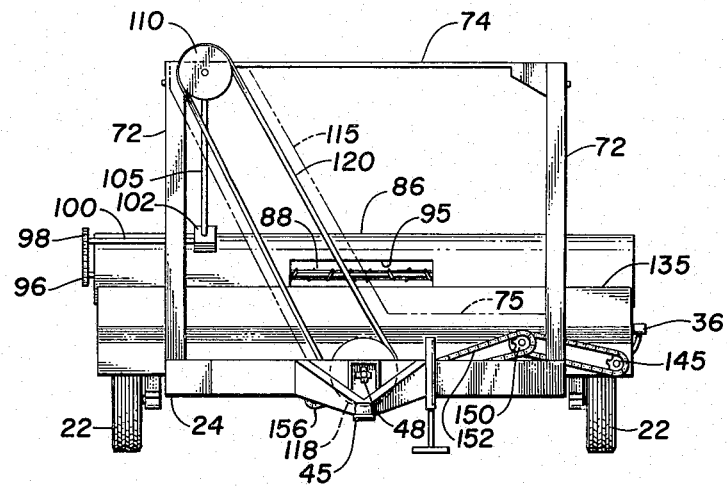
FIG. 2 is a front elevation view of the same.
Figure 3:
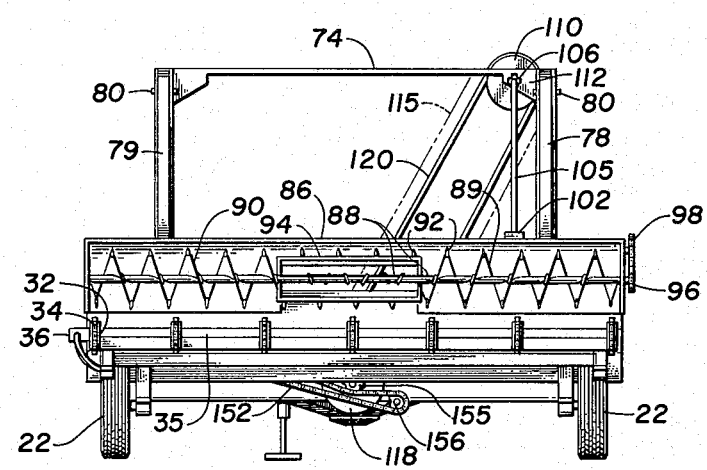
FIG. 3 is a rear elevation view of the stack processor showing the arrangement of the cutting head thereon and with the stack removed.

My improved stack processor is shown in the drawings generally at 10. It is adapted to be connected to a tractor or similar mode of means which will tow the unit through a desired location and will in addition supply the rotary power from a conventional power take off as well as hydraulic pressure or flow to operate the actuators thereof which will be hereafter defined. The processor combines a chassis structure 20 having suitable wheel supports 22 mounted thereon, the chassis being connected to a second chassis frame 24 through a pivotal connection indicated at 26 to permit tilting movement of the chassis 20 with respect to the frame 24. Positioned on top of the chassis 20 is a bed 30 having a plurality of ridge members 32 spaced longitudinally thereon and mounting flights of chain members 34 which are driven from a common shaft 35 and through an hydraulic rotary motor 36 positioned at one end of the bed 30. A suitable hydraulic actuating mechanism 40 is positioned between the frame 24 and the chassis 20 to pivot the same about the pivots 26 for the purpose of tilting the chassis on the wheels and tilting the bed thereon to load a stack of harvested crop such as hay on the processor. The chassis and bed together with the frame and its accompanying hitch will also serve as a suitable transport means for transporting hay stacks of harvested crop between varying locations. The frame 24 mounts a hitch 45 at the extremity of the same opposite the pivots 26 and includes a suitable drive shaft mechanism 48 adapted to be connected to a power take off shaft for the draft vehicle. In addition, the frame 24 mounts a plurality of flexible hose connections 50 through a manifold and from there through solid pipings to and distributed along the angle iron forming the frame to the hydraulic actuators mounted thereon. The bed of the stack mover at the trailing end of the same mounts a pair of guide wheels 60 which are adapted to contact the ground and guide the end of the bed beneath a stack for the purpose of picking up the same and loading the same on the bed in a conventional manner.

The frame 24 at the opposite extremity of the same includes an upright structure 70 formed of a pair of upright members 72 with cross braced members 74, 75 at the top ends and bottom ends of the same.

The upright support structure or member 72 pivotally mount a pair of boom arms 78, 79, at the upper extremities of the same through suitable pivots indicated at 80. The free end of the boom arms are connected to the frame 84 of the cutting and shredding head 85 which extends across the width of the bed 30 on the chassis and frame and overlies the edge of the same. The frame includes a suitable enclosure surrounding the three sides of the frame and mounting therein a shaft 88 carrying a pair of dual augers 89, 90, on the shaft, the augers being oppositely pitched and having a space therebetween at the center of the shaft. The flights of the augers carry a plurality of equidistantly spaced cutting blades or knives 92 and enclosure 86 has an opening 95 at the back end of the same through which shredded material advanced by the augers toward the center of the head is discharged. The spacing between the two oppositely pitched augers 89, 90, mounts three paddles or plates 94 which are welded to shaft 88 for the purpose of discharging the material through opening 95. These paddles also have the same plurality of equidistantly spaced cutting blades 92 or knives as the augers do. The shaft 88 mounting the augers has a suitable drive gear 96 at one end of the same which is coupled to a gear 98 to a shaft 100 leading to a gearing 102 carried on the back of the enclosure of the head. The gearing 102 is connected to a shaft 105 and through a universal joint 106, the shaft extending back parallel with the boom arm and spaced therefrom toward the upright members on the frame 24. The opposite end of the shaft connect to a drive pulley 110 suitably journaled in a bracket member 112 carried by one of the upright support members 72 and the cross bracing 74 at the top of the upright support structure. This pulley member is enclosed in a suitable covering 115 which extends down to the base of the frame 24, and the shift of the power supply 48 mounted on the frame. At this point, a second pulley 118 is mounted on the shaft 48 and a suitable drive belt 120 is positioned over the pulleys 110 and 118 for the purpose of driving the shaft 105 and hence, the shaft 88 mounting the augers with the shredding knives thereon.

The boom arms are pivoted on the upright support structure 70 through a pair of hydraulic actuators 124, 125 which connect respectively to the upright boom arms 78, 79, midway along their extent and to the upright support members 72 near the upper edge of the same. The hydraulic actuators are connected through tubing (not shown) positioned along the extent of the upright support members and along the frame 24 to the hydraulic manifold 50 meeting to the flexible tubing for the hydraulic power supply of the prime mover or tractor.

Positioned between the upright members or structure 70 and the end of the bed 30 are a pair of channel members 135 which define a path transverse to the extent of the bed and at the end of the same. This is positioned across the frame 24 and between the channel members is positioned a conveyor 140 having a pair of drive sprockets 145 at one end of the same and journaling members or guide members 146 of the opposite side of the same. A shaft 148 is connected to the drive sprockets and extends to the upright support structure on the frame wherein an additional pulley 150 is journaled. The pulley being connected by means of a chain 152 to a second pulley 155 and an idler pulley 156 mounted on the pulley 118 and positioned in the cover structure on the upright support. Thus, the power take off in driving the pulley 118 also drives the pulley 155 and through the chains 152, and 120 drive the shafts 150 and 105 powering respectively the conveyor and the shaft mounting the augers on the shredding head. Additional hydraulic connections lead from the manifold 50 along the frame 24 to a hydraulic motor 36 mounted at the end of the bed 30 on the chassis for driving the chain flights on the stack mover. An additional hydraulic line 162 leads to an actuator 40 positioned beneath the bed and chassis and coupled to the frame 24 for the purpose of tilting the chassis with the bed thereon relative to the frame and about the wheels at the pivot connection 26 for the purpose of tilting the bed in stack loading or stack discharging.

In the stack processing operation, the stack of harvested crop is picked up from a ground location by tilting the bed and chassis relative to the frame 24 and driving the chains in a direction to advance the stack on the processing bed. When the stack is fully positioned on the bed, it is tilted back to a horzontal or level position, adjacent the frame so that it may be moved to a position of stack shredding for stock feeding. At this point, the actuators pivoting the boom will raise the boom above the edge of the stack and motor drive from the power take off will be engaged to drive the conveyor and the augers in the shredding head. Actuation or movement of the hydraulic actuators associated with the boom will cause the boom to move in an arcuate direction through the stack tearing the crop material from the stack by cutting and loosening the same from a compacted position and advancing it toward the center of the shredder head. At this point, it will be discharged through the opening in the housing and will drop under the influence of gravity onto the conveyor bed where it will be discharged from the conveyor bed in a direction transverse to the extent of the chassis and the frame 24 to the side of the processor. Conveying equipment may be associated therewith to discharge the shredded crop material at a point remote from the processor or a chute may be attached to the end of the conveyor to insure that the material will be directed in a position and location desired. As the boom is lowered arcuately through the stack, it cuts a swath defining an arc over the stack loosening the material therefrom and separating it from the stack. When the boom reaches its lower position it is elevated through a raised position and the stack is advanced on the bed through the chain flights on the bed to reposition the stack for a new cut with the shredding head. The operation will be continuous, separating crop material from the stack, loosening the same and advancing it in a direction toward the center of the shredding head wherein it will be deposited on the conveyor to be discharged through the side of the same. The steps of advancing a stack on the bed to a position where the bottom slightly overlies the conveyor and lowering or pivoting the shredding head through the same to cut an arcuate path through a stack loosening the material as it is separated from the stack, will be repeated for continuous processing in a normal feeding operation. The entire processor will be moved by the towing vehicle to locations of usage and the process will be continued until the stack mounted on the bed is disposed of or utilized for feeding purposes.

The improved processor performs the function of not only loosening the material as it is separated from the stack by rotating the knives through the same to shred the material but it also advances it to a particular location to avoid spillage and to provide for maximum utilization of crop material for feeding purposes. The structure may be powered from the power take off and a conventional power supply of a tractor with a pair of suitable control valves on the hydraulic power supply to selectively operate the tilt actuator for the bed and the drive chains on the bed for advancing the stack.

In considering this invention, it should be remembered that the present disclosure is illustrative only and the scope of the invention should be determined by the appended claims.

What we claim is:

1. A stack processor for shredding a stack of harvested crop and conveying the shredded material away from the stack comprising, a wheeled support having a stack supporting bed on the same, an upright support positioned on said bed of said wheeled support and spaced therefrom, means positioned on said bed for advancing the stack in the direction of the upright support, a shredding frame pivotally mounted on the upper end of the upright support and mounting a shaft having a pair of oppositely pitched augers spaced apart thereon and extending across the width of the bed, said augers having shredding knives mounted on the flights thereon in circumferentially and longitudinally spaced positions, a lateral conveyor mounted on the wheel support between the bed and the upright support to receive shredded material from the stack and convey it away from the stack in a direction transversed to the direction of movement of the stack, and means on the wheeled support for rotating the augers and pivoting the shredding frame.

2. The stack processor of claim 1 and including a linear actuator pivotally connected between the upright support and the shredding frame for pivoting the shredding frame with the shaft and augers at the extremity of the same through an arc relative to a stack on the bed.

3. The stack feeder of claim 2 and including mechanical drive means positioned on the upright support and coupled through a mechanical drive means along the extent of the upright support and the shredding frame to rotate the shaft with pitched augers thereon.

4. The stack feeder of claim 3 in which the mechanical drive means on the upright support and shredding frame is a chain and gear drive.

5. The stack feeder of claim 3 and including an additional drive means coupled to the mechanical drive on the wheeled support and coupled to the conveyor for driving the same.

6. The stack feeder of Claim 5 in which the wheeled support has a hitch at the extremity of the same adjacent the upright support adapted to be connected to a towing vehicle and in which the mechanical drive has a shaft extending therefrom adapted to be connected to a power take-off of the towing vehicle.

7. The stack feeder of claim 1 and including hydraulic actuator means pivotally connected between the shredding frame and the upright support for pivoting the shredding frame through an arc relative to a stack on the bed and an hydraulic drive means coupled to the means on the bed for advancing the stack to drive the same.

8. The stack feeder of claim 1 in which the oppositely pitched augers have an open center spacing therebetween with paddles having teeth thereon and in which the augers overly the edge of the bed adjacent the conveyor.

9. The method of feeding a stack of harvested crop which includes the steps of loading a stack on to a support; advancing the stack on the bed support in a step-by-step motion until the edge of the stack is adjacent one end of the bed support; pivoting a shredder through the stack from the top thereof and through an arc toward the bottom edge of the stack and adjacent the bed, causing the material in the stack to fall beyond the edge of the stack and the bed support; collecting the shredded material and conveying the same away from the stack in a direction transversed to the direction of advancement of the stack; and repeating the stack advancing, shredding and material collecting and removing steps successively until the stack is totally unloaded from the support.

10. The method of feeding from a stack of claim 9 in which the shredding step moves the material in the stack toward the center of the stack as it falls by gravity to the collecting conveying means.

* * * * *